(12) United States Patent
Zhou et al.

(10) Patent No.: US 8,665,776 B2
(45) Date of Patent: Mar. 4, 2014

(54) METHOD AND SYSTEM FOR DATA TRANSMISSION

(75) Inventors: Zhen Zhou, Shenzhen (CN); Zongjie Wang, Shanghai (CN); Jun Chen, Shanghai (CN); Chongyang Han, Chengdu (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 69 days.

(21) Appl. No.: 13/572,572

(22) Filed: Aug. 10, 2012

(65) Prior Publication Data

US 2012/0307714 A1    Dec. 6, 2012

Related U.S. Application Data

(63) Continuation of application No. PCT/CN2010/079854, filed on Dec. 16, 2010.

(30) Foreign Application Priority Data

Feb. 10, 2010    (CN) .......................... 2010 1 0115415

(51) Int. Cl.
*H04W 72/04* (2009.01)
(52) U.S. Cl.
USPC .......................................................... 370/315
(58) Field of Classification Search
CPC .................................................... H04W 72/04
USPC .......................................................... 370/315
See application file for complete search history.

(56) References Cited

U.S. PATENT DOCUMENTS

| | | | |
|---|---|---|---|
| 2005/0111410 | A1 | 5/2005 | Bazar |
| 2008/0188220 | A1 | 8/2008 | DiGirolamo et al. |
| 2009/0213779 | A1 | 8/2009 | Zhang et al. |
| 2011/0014922 | A1* | 1/2011 | Jen ................................ 455/450 |
| 2011/0134827 | A1* | 6/2011 | Hooli et al. ................... 370/315 |

FOREIGN PATENT DOCUMENTS

| | | |
|---|---|---|
| CN | 1835628 A | 9/2006 |
| CN | 101111047 A | 1/2008 |
| CN | 101150498 A | 3/2008 |
| CN | 101188548 A | 5/2008 |
| CN | 101242553 A | 8/2008 |
| CN | 101267240 A | 9/2008 |
| CN | 101400026 A | 4/2009 |
| EP | 1 507 372 A1 | 2/2005 |
| EP | 2 109 324 A1 | 10/2009 |
| EP | 2 117 197 A1 | 11/2009 |

OTHER PUBLICATIONS

First Chinese Office Action of Chinese Application No. 201010115415.5 mailed Feb. 5, 2013, 10 pages.

(Continued)

*Primary Examiner* — Sulaiman Nooristany
(74) *Attorney, Agent, or Firm* — Slater & Matsil, L.L.P.

(57) ABSTRACT

Embodiments of the present invention provide a method and system for data transmission. The method for data transmission includes: sending, according to a mapping relationship between a first H-RNTI of a user equipment and a second H-RNTI of a relay node accessed by the user equipment, data to the user equipment corresponding to the first H-RNTI by using the relay node corresponding to the second H-RNTI. By using the technical solutions of the embodiments, the coverage capability of a cell edge is enhanced, and the efficiency in transmitting data to a UE at the cell edge is further improved.

15 Claims, 8 Drawing Sheets

(56) References Cited

OTHER PUBLICATIONS

Extended European Search Report received for Application No. 10845589.0, mailed Jun. 5, 2013, 5 pages.

International Search Report received in Patent Cooperation Treaty International Application No. PCT/CN2010/079854 mailed Apr. 7, 2011, 4 pages.

Written Opinion of the International Searching Authority received in Patent Cooperation Treaty International Application No. PCT/CN2010/079854 mailed Apr. 7, 2011, 5 pages.

"3$1^{rd}$ Generation Partnership Project; Technical Specification Group Radio Access Network; High Speed Downlink Packet Access (HSDPA); Overall description; Stage 2 (Release 7)," 3GPP TS 25.308 V7.10.0, Jun. 2009, 52 pages.

\* cited by examiner

METHOD AND SYSTEM FOR DATA TRANSMISSION

CROSS-REFERENCE TO RELATED APPLICATIONS

This application is a continuation of International Application No. PCT/CN2010/079854, filed Dec. 16, 2010, which claims priority to Chinese Patent Application No. 201010115415.5, filed Feb. 10, 2010, both of which applications are incorporated herein by reference.

TECHNICAL FIELD

Embodiments of the present invention relate to the field of data transmission technologies, and in particular, to a method and system for data transmission.

BACKGROUND

In order to accommodate multimedia services' growing demand for high-speed data transmission, the Third Generation Partnership Project (3GPP) proposed the high-speed downlink packet access (HSDPA) technology. HSDPA is a packet-based data service, and specifically, is an optimization and evolution of a packet service in the downlink direction, namely, the direction from a radio access network to a mobile terminal. Therefore, HSDPA is capable of enhancing the downlink part of mobile data transmission, thereby implementing high-speed data transmission.

In the existing HSDPA technology, the transmission mode using a 2-ms transmission time interval (TTI) is widely used for its low data transmission delay and high data transmission rate.

The transmission mode of a 2-ms TTI that is generally used in the existing HSDPA technology improves the data transmission rate, but the transmission mode of the 2-ms TTI belongs to short frame transmission, reducing the downlink coverage capability of a cell edge. Consequently, the efficiency in transmitting data to a user equipment at the cell edge is reduced.

SUMMARY OF THE INVENTION

In one aspect, the present invention is directed to a method and system for data transmission, capable of effectively improving the efficiency in transmitting data to a user equipment at a cell edge.

In one aspect, the present invention provides a method for data transmission, applied in an HSDPA network, where the method includes: sending, according to a mapping relationship between a first H-RNTI of a user equipment and a second H-RNTI of a relay node accessed by the user equipment, data to the user equipment corresponding to the first H-RNTI by using the relay node corresponding to the second H-RNTI.

In another aspect, the present invention provides a radio network control device, where the device includes: an obtaining module, configured to obtain a prestored mapping relationship between a first H-RNTI of a user equipment and a second H-RNTI of a relay node accessed by the user equipment; and a sending module, configured to send, according to the mapping relationship, the first H-RNTI, the second H-RNTI and data to an access device so that the access device sends the data to the user equipment corresponding to the first H-RNTI by using the relay node corresponding to the second H-RNTI.

In another aspect, the present invention provides an access device, where the device includes: a receiving module, configured to receive a first H-RNTI of a user equipment, a second H-RNTI of a relay node accessed by the user equipment and data that are sent by a radio network control device according to a mapping relationship between the first H-RNTI and the second H-RNTI; and a sending module, configured to send, according to the second H-RNTI, the first H-RNTI and the data to the relay node corresponding to the second H-RNTI so that the relay node sends the data to the user equipment corresponding to the first H-RNTI.

In another aspect, the present invention further provides a radio network control device, where the device includes: a first assigning module, configured to assign the second H-RNTI to the relay node according to a network access request sent by the relay node; a second assigning module, configured to assign, according to a service request sent by the user equipment accessing the relay node, the first H-RNTI to the user equipment; an establishing module, configured to establish a mapping relationship between the first H-RNTI of the user equipment and the second H-RNTI of the relay node accessed by the user equipment; a first sending module, configured to send the mapping relationship to an access device; and a second sending module, configured to send the first H-RNTI and data to the access device so that the access device sends, according to the mapping relationship, the data to the user equipment corresponding to the first H-RNTI by using the relay node corresponding to the second H-RNTI.

In another aspect, the present invention further provides an access device, where the device includes: a first receiving module, configured to receive a first H-RNTI of a user equipment and data that are sent by a radio network control device; and a sending module, configured to send, according to a mapping relationship between the first H-RNTI and a second H-RNTI of a relay node accessed by the user equipment, the first H-RNTI and the data to the user equipment corresponding to the first H-RNTI by using the relay node corresponding to the second H-RNTI.

In another aspect, the present invention provides a system for data transmission, where the system includes: a relay node, an access device and a radio network control device.

The radio network control device is configured to obtain a prestored mapping relationship between a first H-RNTI of a user equipment and a second H-RNTI of a relay node accessed by the user equipment; and send, according to the mapping relationship, the first H-RNTI, the second H-RNTI and data to the access device.

The access device is configured to receive the first H-RNTI, the second H-RNTI and the data that are sent by the radio network control device; and send, according to the second H-RNTI, the first H-RNTI and the data to the relay node.

The relay node is configured to receive the first H-RNTI and the data that are sent by the access device; and send the data to the user equipment corresponding to the first H-RNTI.

In another aspect, the present invention further provides a system for data transmission, where the system includes: a relay node, an access device and a radio network control device.

The radio network control device is configured to assign the second H-RNTI to the relay node according to a network access request sent by the relay node; assign, according to a service request sent by the user equipment accessing the relay node, the first H-RNTI to the user equipment; establish a mapping relationship between the first H-RNTI of the user equipment and the second H-RNTI of the relay node accessed by the user equipment; send the mapping relationship to the access device; and send the first H-RNTI and data to the access device.

The access device is configured to receive the first H-RNTI of the user equipment and the data that are sent by the radio network control device; and send, according to the received mapping relationship sent by the radio network control device, the first H-RNTI and the data to the relay node corresponding to the second H-RNTI.

The relay node is configured to receive the first H-RNTI and the data that are sent by the access device; and send the data to the user equipment corresponding to the first H-RNTI.

The method and system for data transmission described above enhance the downlink coverage capability of a cell edge and further improve the efficiency in transmitting data to a user equipment at the cell edge.

BRIEF DESCRIPTION OF THE DRAWINGS

To make the technical solutions in the embodiments of the present invention or in the prior art clearer, the accompanying drawings for the description of the embodiments or the prior art are briefly described in the following. Evidently, the accompanying drawings in the following description illustrate some embodiments of the present invention only and persons of ordinary skill in the art may derive, without any creative efforts, other drawings based on these drawings.

DETAILED DESCRIPTION OF ILLUSTRATIVE EMBODIMENTS

To make the objectives, technical solutions and advantages of the embodiments of the present invention clearer, the technical solutions in the embodiments of the present invention are described clearly and completely in the following with reference to the accompanying drawings in the embodiments of the present invention. Evidently, the described embodiments are only some embodiments of the present invention, rather than all embodiments of the present invention. All other embodiments that persons of ordinary skill in the art may derive, without any creative efforts, based on the embodiments of the present invention fall within the protection scope of the present invention.

In a downlink part of an HSDPA network, multiple user equipments (UE) transmit data simultaneously on a high-speed downlink shared channel (HS-DSCH), and therefore, each UE needs to be identified so that different UEs are capable of receiving their own data on the data channel. A control radio network controller (CRNC) configures an HS-DSCH radio network temporary identity (H-RNTI) respectively for different UEs to identify different UEs. The CRNC notifies an H-RNTI to a Node B and a UE simultaneously. If detecting, on a high-speed shared control channel (HS-SCCH), that an H-RNTI in the downlink data is consistent with the configured H-RNTI, the UE receives data on a corresponding high-speed physical downlink shared channel (HS-PDSCH).

A radio access network in the HSDPA network of the embodiments of the present invention includes a radio network controller (RNC) and a Node B, where data is transmitted between the RNC and the Node B according to the Frame Protocol (FP). The embodiments of the present invention are described in detail in the following with reference to the accompanying drawings and specific implementations.

An embodiment of the present invention provides a method for data transmission. The method for data transmission is applied in an HSDPA network, and includes: sending, according to a mapping relationship between a first H-RNTI of a user equipment and a second H-RNTI of a relay node accessed by the user equipment, data to the user equipment corresponding to the first H-RNTI by using the relay node corresponding to the second H-RNTI.

For example, in an HSDPA network where a relay node (RN) is introduced at a cell edge, data to be sent to a UE may be sent, according to a mapping relationship between a first H-RNTI of the UE and a second H-RNTI of an RN accessed by the UE, to the UE accurately by using the RN.

The method for data transmission according to this embodiment can enhance the downlink coverage capability of a cell edge and further improve the efficiency in transmitting data to a user equipment at the cell edge.

Figure 1:
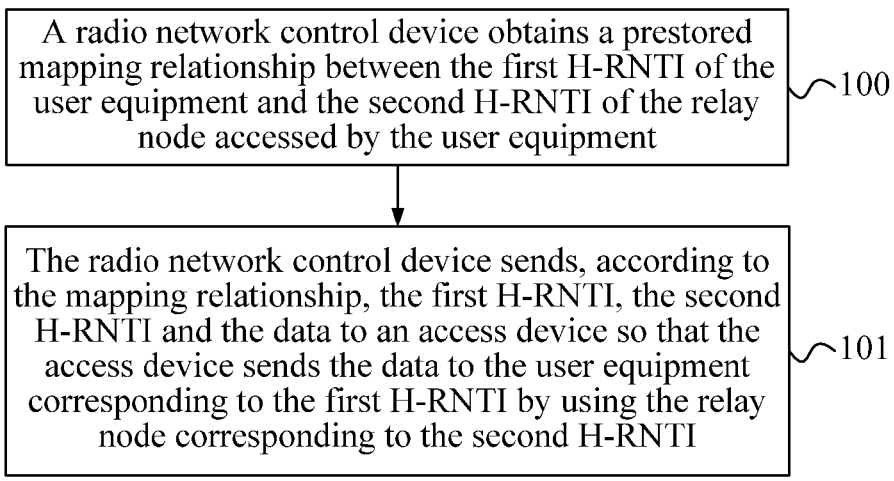
FIG. 1 is a flowchart of a method for data transmission according to an embodiment of the present invention.

FIG. 1 is a flowchart of a method for data transmission according to an embodiment of the present invention. As shown in FIG. 1, the method for data transmission according to this embodiment may be as follows.

100: A radio network control device obtains a prestored mapping relationship between the first H-RNTI of the user equipment and the second H-RNTI of the relay node accessed by the user equipment.

101: The radio network control device sends, according to the mapping relationship, the first H-RNTI, the second H-RNTI and the data to an access device so that the access device sends the data to the user equipment corresponding to the first H-RNTI by using the relay node corresponding to the second H-RNTI.

For example, an RNC manages and maintains a mapping relationship between a first H-RNTI of a UE and a second H-RNTI of an RN accessed by the UE. The RNC obtains the mapping relationship, prestored in the RNC, between the first H-RNTI of the UE and the second H-RNTI of the RN accessed by the UE, and then sends the first H-RNTI, the second H-RNTI and data, for example, sends an FP data packet including the first H-RNTI, the second H-RNTI and data, to an access device (for example, a Node B or a gateway; a Node B is used as an example of the access device below) through an Iub interface according to the mapping relationship. For example, the HSDPA FP data packet sent by the RNC to the Node B is specifically in the form shown in Table 1.

TABLE 1

| FP header | Second H-RNTI | DATA |
|---|---|---|

As shown in Table 1, the FP header of the data packet carries the second H-RNTI of the RN accessed by the UE that is configured to receive data, and the DATA part includes the first H-RNTI assigned to the UE and the data to be sent to the UE. In this way, it can be ensured that after receiving the FP data packet, the Node B parses the FP data packet to obtain the second H-RNTI carried in the FP header, and then sends the first H-RNTI and the data to the RN corresponding to the second H-RNTI accurately. When sending the data to the RN, the Node B adds the second H-RNTI of the RN on an HS-SCCH of an air interface so that after the corresponding RN detects that this second H-RNTI is consistent with the second H-RNTI configured for the RN, the RN receives the first H-RNTI and the data that are sent by the Node B to the RN. After receiving the first H-RNTI and the data, the RN performs parsing to obtain the first H-RNTI, sends the data to the UE corresponding to the first H-RNTI, and adds the first H-RNTI of the UE on the HS-SCCH of the air interface so that on the UE side, after the UE detects that the first H-RNTI is consistent with the first H-RNTI configured for the UE, the UE receives the data that is sent by the RN to the UE.

In the method for data transmission according to this embodiment, the RN is introduced in the HSDPA network, and further, the RNC can accurately transmit, according to the prestored mapping relationship between the first H-RNTI of the UE and the second H-RNTI of the RN accessed by the UE, the data to be sent to the UE to the UE within the coverage of the RN by using the Node B and the RN. By using the technical solution of this embodiment, the coverage capability of the cell edge is enhanced, and the efficiency in transmitting data to the UE at the cell edge is further improved.

In another embodiment of the present invention, for example, before sending the first H-RNTI, the second H-RNTI and the data to the access device in the foregoing embodiment, the method for data transmission may also be as follows.

(1) The radio network control device assigns the second H-RNTI to the relay node according to a network access request sent by the relay node.

For example, after an RN is introduced at a cell edge, the RN sends a network access request to the RNC by using the Node B, and after receiving the network access request of the RN, the RNC assigns a second H-RNTI to the RN and notifies the second H-RNTI to the Node B through the Iub interface, and the Node B notifies the second H-RNTI to the RN.

(2) The radio network control device assigns, according to a service request sent by the user equipment accessing the relay node, the first H-RNTI to the user equipment.

For example, after an RN is introduced at the cell edge, a UE within the service scope of the RN is connected under the RN. After accessing the RN, the UE sends an HSDPA service request to the access network. When receiving the HSDPA service request and preparing for establishing an HSDPA service for the UE, the RNC on the network side assigns a first H-RNTI to the UE and notifies the first H-RNTI to the Node B through the Iub interface, and the Node B notifies, by using the RN, the first H-RNTI to the UE, under the RN, that initiates the HSDPA service request.

(3) The radio network control device establishes and stores the mapping relationship between the first H-RNTI of the user equipment and the second H-RNTI of the relay node accessed by the user equipment.

For example, after the RNC assigns the second H-RNTI to the RN accessing the network and assigns the first H-RNTI to the UE accessing the RN, the RN establishes and stores the mapping relationship between the first H-RNTI of the UE and the second H-RNTI of the RN accessed by the UE. The mapping relationship binds the UE and the RN accessed by the UE. When the second H-RNTI of the RN or the first H-RNTI of the UE accessing the RN changes, the mapping relationship needs to be modified and updated.

By introducing a relay node (RN) at a cell edge of the HSDPA network, the embodiment of the present invention solves the low efficiency problem that the transmission mode of a 2-ms TTI used in the existing HSDPA technologies decreases the downlink coverage capability of the cell edge, resulting in a delay or an error in transmission of data to a UE at the cell edge and a failure to send data to the UE at the cell edge. In the embodiment of the present invention, after the relay node is introduced at the cell edge, the Node B is capable of sending the data to be sent to the UE within the coverage of the RN to the UE accurately by using the RN, effectively improving the efficiency in transmitting data to the UE at the cell edge.

Figure 2:
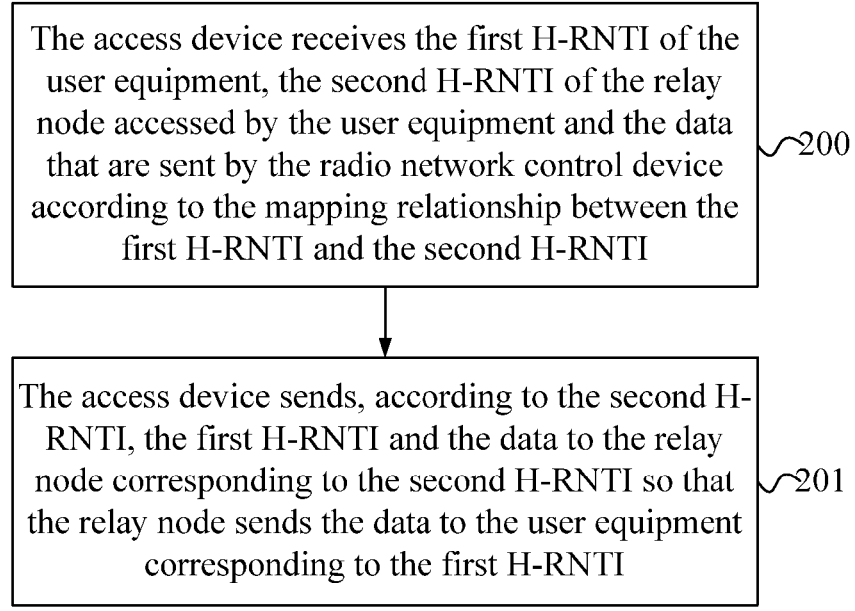
FIG. 2 is a flowchart of another method for data transmission according to an embodiment of the present invention.

FIG. 2 is a flowchart of another method for data transmission according to an embodiment of the present invention. As shown in FIG. 2, the method for data transmission according to this embodiment may specifically be as follows.

200: The access device receives the first H-RNTI of the user equipment, the second H-RNTI of the relay node accessed by the user equipment and the data that are sent by the radio network control device according to the mapping relationship between the first H-RNTI and the second H-RNTI.

For example, in the HSDPA network, after an RN is added at a cell edge, an RNC assigns a first H-RNTI and a second H-RNTI respectively to a UE accessing the RN and the RN, and establishes a mapping relationship between the first H-RNTI and the second H-RNTI. Then, the RNC sends, according to the mapping relationship, the first H-RNTI, the second H-RNTI and data, for example, sends an FP data packet including the first H-RNTI, the second H-RNTI and data, to an access device (for example, a Node B or a gateway; for ease of description, a Node B is used as an example in the following description). Accordingly, the Node B receives the FP data packet, including the first H-RNTI, the second H-RNTI and the data, that is sent by the RNC. The FP data packet takes the form as shown in the foregoing Table 1. The FP header of the FP data packet carries the second H-RNTI of the RN accessed by the destination UE to which the data is sent, and the DATA part includes the first H-RNTI assigned to the UE and the data to be sent to the UE.

201: The access device sends, according to the second H-RNTI, the first H-RNTI and the data to the relay node corresponding to the second H-RNTI so that the relay node sends the data to the user equipment corresponding to the first H-RNTI.

For example, the Node B sends, according to the second H-RNTI of the RN carried in the received FP data packet, the DATA part in Table 1, namely, the first H-RNTI and the data to be sent to the UE, to the RN corresponding to the second H-RNTI. The Node B adds the second H-RNTI of the RN on the HS-SCCH of the air interface so that upon detecting the second H-RNTI the same as that configured for the RN, the RN receives the first H-RNTI to be sent to the UE accessing the RN and the data to be sent to the UE and parses the received first H-RNTI and data to obtain the first H-RNTI. The RN sends, according to the obtained first H-RNTI, the data to the UE corresponding to the first H-RNTI. The RN adds the first H-RNTI of the UE on the HS-SCCH of the air interface so that after the UE detects that the first H-RNTI is consistent with the first H-RNTI configured for the UE, the UE receives the data sent by the RN to the UE.

In the method for data transmission according to this embodiment, after the RN is connected under the Node B, the RNC in the HSDPA network sends, according to the mapping relationship between the first H-RNTI of the UE and the second H-RNTI of the RN accessed by the UE, the first H-RNTI, the second H-RNTI and the data to be sent to the UE to the Node B, and the Node B is capable of sending, according to the received second H-RNTI, the data to the UE corresponding to the first H-RNTI accurately by using the RN corresponding to the second H-RNTI. By using the technical solution of this embodiment, the coverage capability of the cell edge is enhanced, and the efficiency in transmitting data to the UE at the cell edge is further improved.

Figure 3:
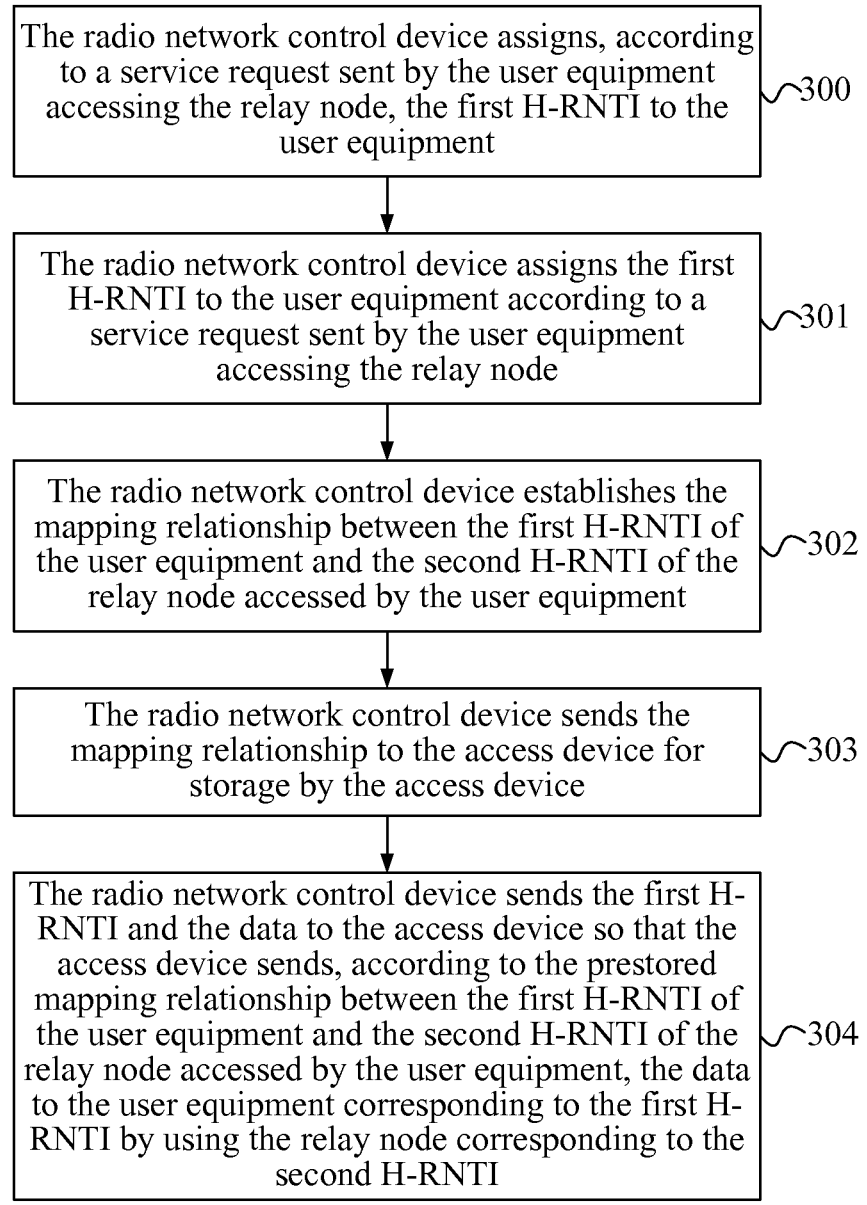
FIG. 3 is a flowchart of still another method for data transmission according to an embodiment of the present invention.

FIG. 3 is a flowchart of still another method for data transmission according to an embodiment of the present invention. As shown in FIG. 3, the method for data transmission according to this embodiment may specifically be as follows.

300: The radio network control device assigns the second H-RNTI to the relay node according to a network access request sent by the relay node.

For example, after an RN is introduced at a cell edge, the RN sends a network access request to the RNC by using the Node B, and after receiving the network access request of the RN, the RNC assigns a second H-RNTI to the RN and notifies the second H-RNTI to the Node B through the Iub interface, and the Node B notifies the second H-RNTI to the RN.

301: The radio network control device assigns, according to a service request sent by the user equipment accessing the relay node, the first H-RNTI to the user equipment.

For example, after an RN is introduced at a cell edge, the RN covers UEs within a certain area. After accessing the RN of the service scope where the UE is located, the UE sends an HSDPA service request to the access network. When receiving the HSDPA service request and preparing for establishing an HSDPA service for the UE, the RNC on the network side first assigns a first H-RNTI to the UE and notifies the first H-RNTI to the Node B through the Iub interface, and the Node B notifies, by using the RN, the first H-RNTI to the UE, under the RN, that initiates the HSDPA service request.

302: The radio network control device establishes the mapping relationship between the first H-RNTI of the user equipment and the second H-RNTI of the relay node accessed by the user equipment.

For example, after the RNC assigns the second H-RNTI to the RN accessing the network and assigns the first H-RNTI to the UE accessing the RN, the RNC establishes the mapping relationship between the first H-RNTI of the UE and the second H-RNTI of the RN accessed by the UE and stores the mapping relationship in the RNC so that subsequently, the RNC sends data to the Node B according to the mapping relationship. The mapping relationship binds the UE and the RN accessed by the UE. When the second H-RNTI of the RN or the first H-RNTI of the UE accessing the RN changes, the mapping relationship needs to be modified and updated.

303: The radio network control device sends the mapping relationship to the access device for storage by the access device.

For example, the RNC sends the mapping relationship to the corresponding Node B controlled by the RNC, and the Node B stores the mapping relationship. The RN locates within the service scope of the Node B.

304: The radio network control device sends the first H-RNTI and the data to the access device so that the access device sends, according to the prestored mapping relationship between the first H-RNTI of the user equipment and the second H-RNTI of the relay node accessed by the user equipment, the data to the user equipment corresponding to the first H-RNTI by using the relay node corresponding to the second H-RNTI.

For example, after sending the mapping relationship to the corresponding Node B controlled by the RNC, the RNC sends the FP data packet shown in Table 2 to the Node B, where the DATA in the FP data packet includes the first H-RNTI of the destination UE to which the data is sent and the data to be sent to the UE. After receiving the FP data packet, the Node B parses the FP data packet to obtain the first H-RNTI of the UE, and obtains the second H-RNTI corresponding to the first H-RNTI according to the received mapping relationship between the first H-RNTI of the UE and the second H-RNTI of the RN accessed by the UE, and then sends the first H-RNTI of the UE and the data to be sent to the UE to the RN node corresponding to the second H-RNTI, that is, sends the first H-RNTI and the data to be sent to the UE to the RN node accessed by the UE, so that the RN sends the data to the UE corresponding to the first H-RNTI.

TABLE 2

| FP header | DATA |
| --- | --- |

In another embodiment of the present invention, when sending the data to the RN, the Node B adds the second H-RNTI of the RN on the HS-SCCH of the air interface so that when detecting the second H-RNTI the same as that configured for the RN, the RN receives the first H-RNTI to be sent to the destination UE and the data to be sent to the UE and parses the received content to obtain the first H-RNTI. The RN sends, according to the obtained first H-RNTI, the data to be sent to the UE to the UE corresponding to the first H-RNTI. The RN adds the first H-RNTI of the UE on the HS-SCCH of the air interface so that after detecting that the first H-RNTI is consistent with the first H-RNTI configured for the UE, the UE receives the data sent by the RN to the UE.

In the method for data transmission according to this embodiment, the RN is introduced in the HSDPA network, and further, the first H-RNTI and the second H-RNTI are respectively assigned to the UE accessing the RN and the RN, and the mapping relationship between the first H-RNTI and the second H-RNTI is established and sent to the Node B so that the Node B sends, according to the mapping relationship, the received data to be sent to the UE to the UE within the coverage of the RN accurately by using the RN. By using the technical solution of this embodiment, the coverage capability of the cell edge is enhanced, and the efficiency in transmitting data to the UE at the cell edge is further improved.

Figure 4:
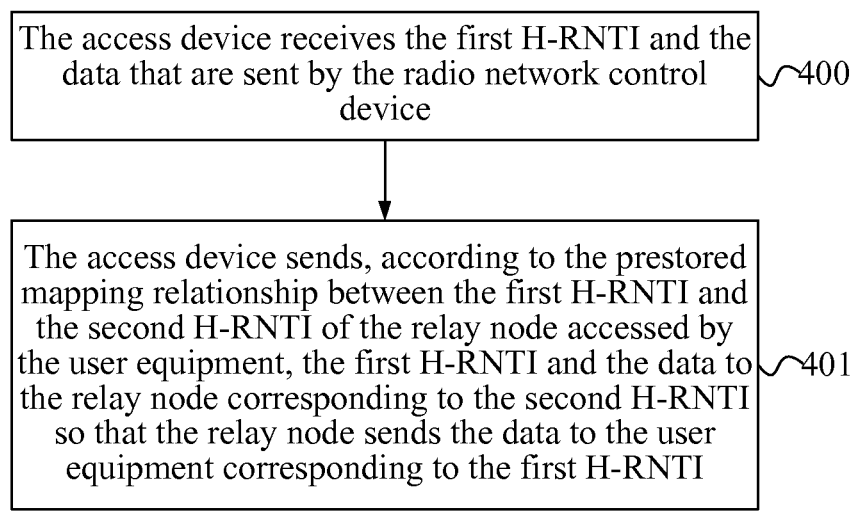
FIG. 4 is a flowchart of yet still another method for data transmission according to an embodiment of the present invention.

FIG. 4 is a flowchart of yet still another method for data transmission according to an embodiment of the present invention. As shown in FIG. 4, the method for data transmission according to this embodiment may specifically be as follows.

400: The access device receives the first H-RNTI and the data that are sent by the radio network control device.

For example, the Node B receives an FP data packet that is sent by the RNC and includes the first H-RNTI assigned to the UE receiving the data and the data.

401: The access device sends, according to the prestored mapping relationship between the first H-RNTI and the second H-RNTI of the relay node accessed by the user equipment, the first H-RNTI and the data to the relay node corresponding to the second H-RNTI so that the relay node sends the data to the user equipment corresponding to the first H-RNTI.

For example, after receiving the FP data packet sent by the RNC, the Node B parses the FP data packet to obtain the first H-RNTI of the UE, obtains, according to the mapping relationship, stored by the Node B, between the first H-RNTI of the UE and the second H-RNTI of the RN accessed by the UE, the second H-RNTI corresponding to the first H-RNTI, and sends the first H-RNTI of the UE and the data to be sent to the UE to the RN corresponding to the second H-RNTI so that the RN sends, according to the first H-RNTI, the data to the UE corresponding to the first H-RNTI.

In another embodiment of the present invention, when sending the data to the RN, the Node B adds the second H-RNTI of the RN on the HS-SCCH of the air interface so that when detecting the second H-RNTI the same as that configured for the RN, the RN receives and parses the first H-RNTI of the UE and the data to be sent to the UE to obtain the first H-RNTI. The RN sends, according to the obtained first H-RNTI, the data to the UE corresponding to the first H-RNTI. In another embodiment of the present invention, when sending the data packet to the UE, the RN also adds the first H-RNTI of the UE on the HS-SCCH of the air interface so that on the UE side, after detecting that the first H-RNTI is consistent with the first H-RNTI configured for the UE, the UE receives the data sent by the RN to the UE.

In the method for data transmission according to this embodiment, the RN is introduced in the HSDPA network, and further, the first H-RNTI and the second H-RNTI are respectively assigned to the UE accessing the RN and the RN, and the mapping relationship between the first H-RNTI and the second H-RNTI is established and sent to the Node B so that the Node B sends, according to the mapping relationship, the data to be sent to the UE to the UE accurately by using the RN accessed by the UE. By using the technical solution of this embodiment, the coverage capability of the cell edge is enhanced, and the data can be sent accurately and effectively, thus further improving the efficiency in transmitting data to the UE at the cell edge.

In another embodiment of the present invention, for example, before 400 "The access device receives the first H-RNTI and the data that are sent by the radio network control device" in the foregoing embodiment, the method for data transmission further includes: receiving and storing, by the access device, the mapping relationship that is sent by the radio network control device and established between the second H-RNTI assigned to the relay node sending the network access request and the first H-RNTI assigned to the user equipment accessing the relay node.

For example, before 400 in the embodiment shown in FIG. 4, the Node B receives the mapping relationship, sent by the RNC, between the first H-RNTI of the UE and the second H-RNTI of the RN accessed by the UE and stores the mapping relationship in the Node B.

Although in this embodiment, the Node B manages and maintains the mapping relationship between the first H-RNTI of the UE and the second H-RNTI of the RN accessed by the UE, the mapping relationship is established by the RNC and then sent to the Node B, which may be as follows.

(a) The radio network control device assigns the second H-RNTI to the relay node according to a network access request sent by the relay node.

For example, after an RN is introduced at a cell edge, the RN sends a network access request to the RNC by using the Node B, and after receiving the network access request of the RN, the RNC assigns a second H-RNTI to the RN and notifies the second H-RNTI to the Node B through the Iub interface, and the Node B notifies the second H-RNTI to the RN.

(b) The radio network control device assigns, according to a service request sent by the user equipment accessing the relay node, the first H-RNTI to the user equipment.

For example, after an RN is introduced at a cell edge, the RN covers UEs within a certain area. After a UE falling within the service scope of the RN accesses the RN, the UE sends an HSDPA service request to the access network. When receiving the HSDPA service request and preparing for establishing an HSDPA service for the UE, the RNC on the network side first assigns a first H-RNTI to the UE and notifies the first H-RNTI to the Node B through the Iub interface, and the Node B notifies, by using the RN, the first H-RNTI to the UE, under the RN, that initiates the HSDPA service request.

(c) The radio network control device establishes the mapping relationship between the first H-RNTI of the user equipment and the second H-RNTI of the relay node accessed by the user equipment.

For example, after the RNC assigns the second H-RNTI to the RN accessing the network and assigns the first H-RNTI to the UE accessing the RN, the RNC establishes the mapping relationship between the first H-RNTI of the UE and the second H-RNTI of the RN accessed by the UE. The mapping relationship binds the UE and the RN accessed by the UE. When the second H-RNTI of the RN or the first H-RNTI of the UE accessing the RN changes, the mapping relationship needs to be modified and updated.

After establishing the mapping relationship, the RNC sends the mapping relationship to the Node B through the Iub interface for storage by the Node B so that subsequently, the Node B can send, according to the mapping relationship, the data to be sent to the UE to the UE accurately by using the RN accessed by the UE.

In the foregoing technical solution, the mapping relationship is established between the first H-RNTI of the UE and the second H-RNTI of the RN accessed by the UE to ensure that the access network can send the delivered data to the destination UE accurately and effectively by using the RN, thus effectively ensuring the data transmission efficiency.

Figure 5:
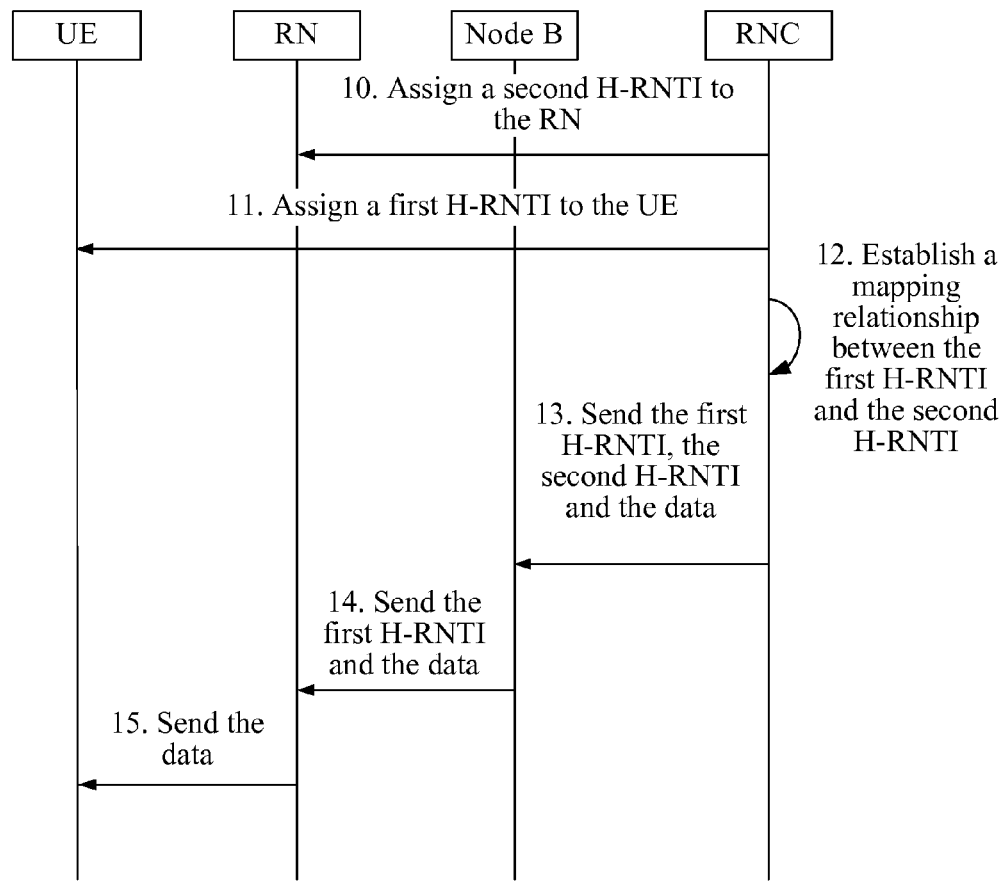
FIG. 5 is a signaling diagram of a method for data transmission according to an embodiment of the present invention.

FIG. 5 is a signaling diagram of a method for data transmission according to an embodiment of the present invention. As shown in FIG. 5, the method for data transmission according to this embodiment may specifically be as follows.

10: An RN accesses the network, and the RNC assigns a second H-RNTI to the RN.

For example, after an RN is introduced at a cell edge, the RN sends a network access request to the RNC by using the Node B, and after receiving the network access request of the RN, the RNC assigns a second H-RNTI to the RN and notifies the second H-RNTI to the Node B through the Iub interface, and the Node B notifies the second H-RNTI to the RN.

11: A UE accessing the RN initiates a service request, and the RNC assigns a first H-RNTI to the UE.

For example, after an RN is introduced at a cell edge, the RN covers UEs within a certain area. A UE accesses the RN within this service scope, and after accessing the RN, the UE sends an HSDPA service request to the access network. When receiving the HSDPA service request and preparing for establishing an HSDPA service for the UE, the RNC on the network side assigns a first H-RNTI to the UE and notifies the first H-RNTI to the Node B through the Iub interface, and the Node B notifies, by using the RN, the first H-RNTI to the UE, under the RN, that initiates the HSDPA service request.

12: The RNC establishes a mapping relationship between the first H-RNTI of the UE and the second H-RNTI of the RN accessed by the UE.

For example, the RNC establishes the mapping relationship between the first H-RNTI of the UE and the second H-RNTI of the RN accessed by the UE, and manages and maintains the mapping relationship. The mapping relationship established by the RNC is equivalent to binding the UE and the RN accessed by the UE. When the second H-RNTI of the RN or the first H-RNTI of the UE accessing the RN changes, the mapping relationship needs to be modified and updated.

13: The RNC sends the first H-RNTI, the second H-RNTI and the data to the Node B.

For example, the RNC sends the first H-RNTI, the second H-RNTI and the data to the Node B. For example, the RNC sends the FP data packet as shown in the foregoing Table 1 to the Node B. For example, the FP header of the FP data packet carries the second H-RNTI of the RN accessed by the UE that is configured to receive the data, and the DATA part includes the first H-RNTI assigned to the UE and the data to be sent to the UE.

14: The Node B sends the first H-RNTI and the data to the RN corresponding to the second H-RNTI.

For example, after receiving from the RNC the first H-RNTI of the UE, the second H-RNTI of the RN accessed by the UE and the data to be sent to the UE, the Node B first performs parsing to obtain the second H-RNTI carried in the header of the FP data packet, and then sends the first H-RNTI assigned to the UE and the data to be sent to the UE to the RN corresponding to the second H-RNTI. In another embodiment of the present invention, when sending the data to the RN, the Node B adds the second H-RNTI of the RN on the HS-SCCH of the air interface so that after the corresponding RN detects the second H-RNTI, the RN receives the first H-RNTI and the data that are sent by the Node B to the RN.

15: The RN sends the data to the UE corresponding to the first H-RNTI.

For example, after receiving the first H-RNTI and the data that are sent by the Node B, the RN performs parsing to obtain the first H-RNTI, and then sends the data to the UE corresponding to the first H-RNTI. In another embodiment of the present invention, when sending the data to the UE, the RN adds the first H-RNTI of the UE on the HS-SCCH of the air interface so that on the UE side, after detecting that the first H-RNTI is consistent with the first H-RNTI configured for the UE, the UE receives the data sent by the RN to the UE.

In the method for data transmission according to this embodiment, the RN is introduced in the HSDPA network, and further, the first H-RNTI and the second H-RNTI are respectively assigned to the UE accessing the RN and the RN, the mapping relationship between the first H-RNTI and the second H-RNTI is established; the RNC sends, according to the mapping relationship, the first H-RNTI of the UE, the second H-RNTI of the RN and the data to be sent to the UE to the Node B so that the Node B sends, according to the second H-RNTI, the first H-RNTI and the data to the RN, and the RN sends, according to the first H-RNTI, the data to the corresponding UE. By using the technical solution of this embodiment, the coverage capability of the cell edge is enhanced, and the data can be sent to the UE accurately and effectively, thus improving the efficiency in transmitting data to the UE at the cell edge.

Figure 6:
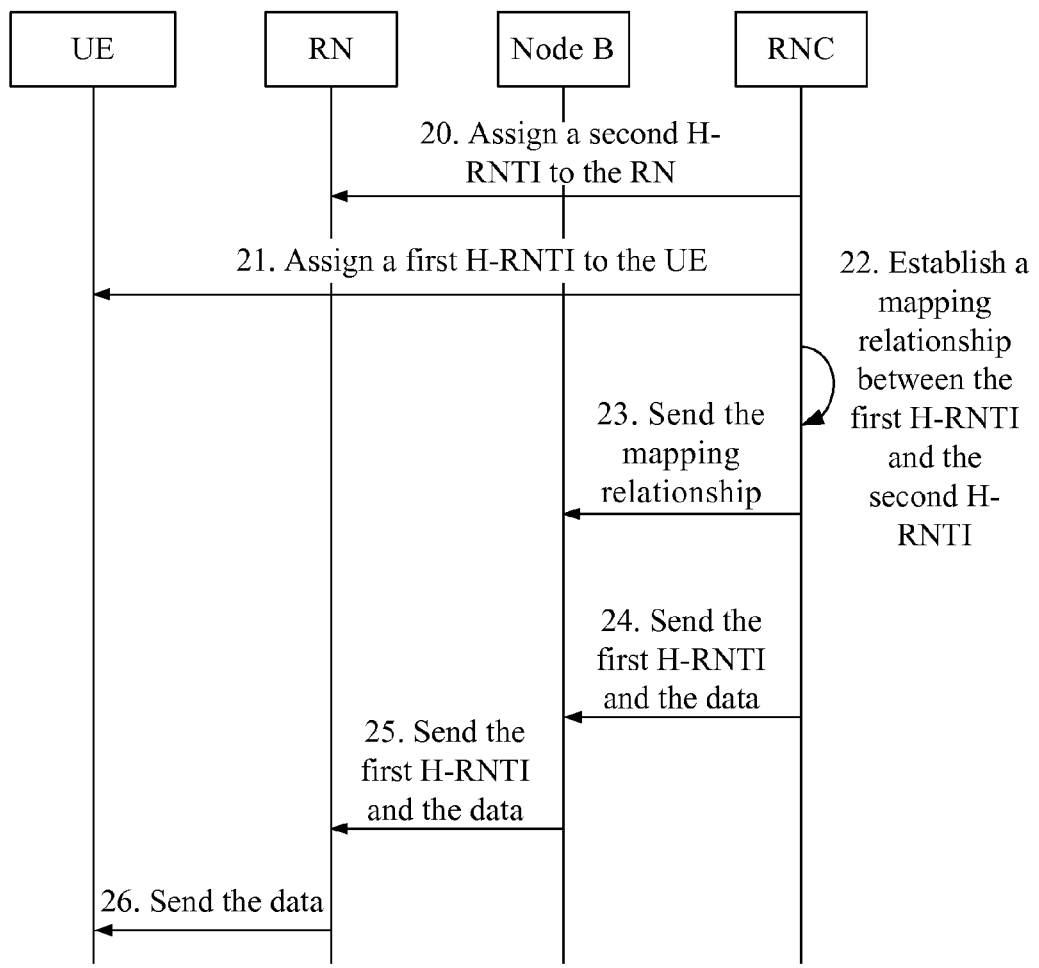
FIG. 6 is a signaling diagram of a method for data transmission according to an embodiment of the present invention.

FIG. 6 is a signaling diagram of a method for data transmission according to an embodiment of the present invention. Unlike the embodiment shown in FIG. 5, in this embodiment, the Node B manages and maintains the mapping relationship between the first H-RNTI of the UE and the second H-RNTI of the RN accessed by the UE. As shown in FIG. 6, the method for data transmission according to this embodiment may specifically be as follows.

20: The RN accesses the network, and the RNC assigns a second H-RNTI to the RN.

21: A UE accessing the RN initiates a service request, and the RNC assigns a first H-RNTI to the UE.

22: The RNC establishes a mapping relationship between the first H-RNTI of the UE and the second H-RNTI of the RN accessed by the UE.

The implementation procedure of 20-22 is similar to that of 10-12 in the embodiment shown in FIG. 5, the details of which can be seen in the foregoing embodiment and is not repeatedly described here.

23: The RNC sends the mapping relationship to the Node B.

In this embodiment, the Node B manages and maintains the mapping relationship between the first H-RNTI of the UE and the second H-RNTI of the RN accessed by the UE, and after establishing the mapping relationship, the RNC sends the mapping relationship to the Node B and the Node B stores the mapping relationship. The mapping relationship established by the RNC binds the UE and the RN accessed by the UE. When the second H-RNTI of the RN or the first H-RNTI of the UE accessing the RN changes, the mapping relationship needs to be modified and updated. For example, the modification of the mapping relationship is still accomplished by the RNC, and after modifying the mapping relationship, the RNC sends the modified mapping relationship to the Node B.

24: The RNC sends to the Node B the first H-RNTI of the UE and the data to be sent to the UE.

For example, the RNC sends to the Node B the FP data packet as shown in the foregoing Table 2. For example, the FP data packet includes the first H-RNTI of the UE and the data of the UE.

25: The Node B sends, according to the prestored mapping relationship, the first H-RNTI and the data to the RN corresponding to the second H-RNTI.

For example, after receiving the FP data packet sent by the RNC, the Node B first performs parsing to obtain the first H-RNTI of the UE, and then sends, according to the prestored mapping relationship between the first H-RNTI of the UE and the second H-RNTI of the RN accessed by the UE, the first H-RNTI and the data to the RN corresponding to the second H-RNTI.

In another embodiment of the present invention, when sending the first H-RNTI and the data to the RN, the Node B adds the second H-RNTI of the RN on the HS-SCCH of the air interface so that after the corresponding RN detects the second H-RNTI the same as that configured for the RN, the RN receives the first H-RNTI and the data that are sent by the Node B to the RN.

26: The RN sends the data to the UE corresponding to the first H-RNTI.

For example, after receiving the first H-RNTI and the data that are sent by the Node B, the RN performs parsing to obtain the first H-RNTI, and then sends the data to the UE corresponding to the first H-RNTI. Here, when sending the data to the UE, the RN adds the first H-RNTI of the UE on the HS-SCCH of the air interface so that on the UE side, after detecting that the first H-RNTI is consistent with the first H-RNTI configured for the UE, the UE receives the data sent by the RN to the UE.

In the method for data transmission according to this embodiment, the RN is introduced in the HSDPA network, and further, the first H-RNTI and the second H-RNTI are respectively assigned to the UE accessing the RN and the RN, and the mapping relationship between the first H-RNTI and the second H-RNTI is established and sent to the Node B. The RNC sends the first H-RNTI and the data to the Node B, the Node B sends, according to the prestored mapping relationship, the first H-RNTI and the data to the RN corresponding to the second H-RNTI, and the RN sends the data to the UE corresponding to the first H-RNTI. By using the technical solution of this embodiment, the coverage capability of the cell edge is enhanced, and the data can be sent to the UE accurately and effectively, thus improving the efficiency in transmitting data to the UE at the cell edge.

Persons of ordinary skill in the art may understand that all or part of steps in the aforementioned method embodiments may be implemented by a program instructing relevant hardware. The program may be stored in a computer readable storage medium. When the program runs, the steps of the aforementioned method embodiments are performed. The storage medium may be any medium capable of storing program codes, such as a ROM, a RAM, a magnetic disk or an optical disk.

Figure 7:
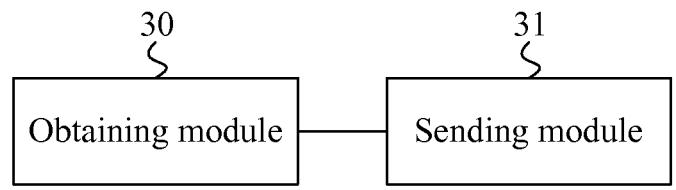
FIG. 7 is a schematic structural diagram of a radio network control device according to an embodiment of the present invention.

FIG. 7 is a schematic structural diagram of a radio network control device according to an embodiment of the present invention. As shown in FIG. 7, the radio network control device according to this embodiment may include: an obtaining module 30 and a sending module 31.

The obtaining module 30 is configured to obtain a prestored mapping relationship between a first H-RNTI of a user equipment and a second H-RNTI of a relay node accessed by the user equipment; and the sending module 31 is configured to send, according to the mapping relationship, the first H-RNTI, the second H-RNTI and data to an access device so that the access device sends the data to the user equipment corresponding to the first H-RNTI by using the relay node corresponding to the second H-RNTI.

For example, the radio network control device according to this embodiment may be an RNC. The obtaining module 30 is configured to obtain the mapping relationship, prestored in the RNC, between the first H-RNTI of the UE and the second H-RNTI of the RN accessed by the UE. The sending module 31 is connected to the obtaining module 30, and sends, according to the mapping relationship obtained by the obtaining module 30, the first H-RNTI, the second H-RNTI and the data to the Node B so that the Node B sends, according to the second H-RNTI, the first H-RNTI and the data to the RN corresponding to the second H-RNTI, and the RN sends the data to the UE corresponding to the first H-RNTI.

The implementation mechanism of data transmission by the radio network control device according to this embodiment and between the modules in the radio network control device is the same as that of the embodiment shown in FIG. 1, the details of which can also be seen in the relevant description of the foregoing embodiment and is not repeatedly described here.

In the radio network control device according to this embodiment, the two modules are used to implement data transmission to the UE at the cell edge within the coverage of the RN by using the RN in the HSDPA network where the RN is introduced. By using the technical solution of this embodiment, the coverage capability of the cell edge is enhanced, and it is further ensured that the data can be sent accurately and effectively to the destination UE, thus improving the efficiency in transmitting data to the UE at the cell edge.

Figure 8:
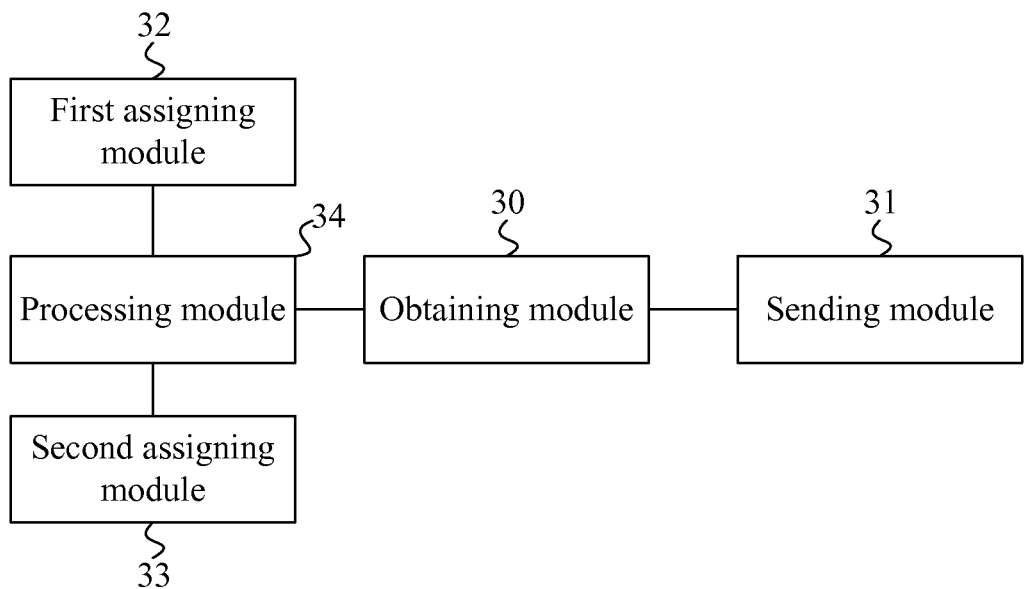
FIG. 8 is a schematic structural diagram of another radio network control device according to an embodiment of the present invention.

FIG. 8 is a schematic structural diagram of another radio network control device according to an embodiment of the present invention. As shown in FIG. 8, on the basis of the embodiment shown in FIG. 7, the radio network control device according to this embodiment further includes: a first assigning module 32, a second assigning module 33 and a processing module 34.

The first assigning module 32 is configured to assign the second H-RNTI to the relay node according to a network access request sent by the relay node; the second assigning module 33 is configured to assign, according to a service request sent by the user equipment accessing the relay node, the first H-RNTI to the user equipment; and the processing module 34 is configured to establish and store the mapping relationship between the first H-RNTI of the user equipment and the second H-RNTI of the relay node accessed by the user equipment.

For example, the radio network control device according to this embodiment may be an RNC. In this embodiment, the first assigning module 32 assigns the second H-RNTI to the newly introduced RN according to the network access request of the RN; the second assigning module 33 assigns the first H-RNTI to the UE accessing the RN according to the service request initiated by the UE; and the processing module 34 is connected to the first assigning module 32 and the second assigning module 33 respectively, and establishes a mapping relationship between the first H-RNTI of the UE that is obtained by the second assigning module 33 and the second H-RNTI of the RN that is obtained by the first assigning module 32 and stores the mapping relationship in the RNC so that in subsequent delivery of data, the obtaining module 30 in the RNC obtains the mapping relationship.

The implementation mechanism of data transmission by the radio network control device according to this embodiment and between the modules in the radio network control device is the same as that of the subsequent parts (1) to (3) of the embodiment shown in FIG. 1, the details of which can also be seen in the relevant description of the foregoing embodiment and is not repeatedly described here.

In the radio network control device according to this embodiment, the modules are used to implement the establishment of the mapping relationship between the first H-RNTI of the UE and the second H-RNTI of the RN accessed by the UE to ensure that the access network can send the delivered data to the UE accurately and effectively by the RN, thus effectively ensuring the data transmission efficiency.

Figure 9:
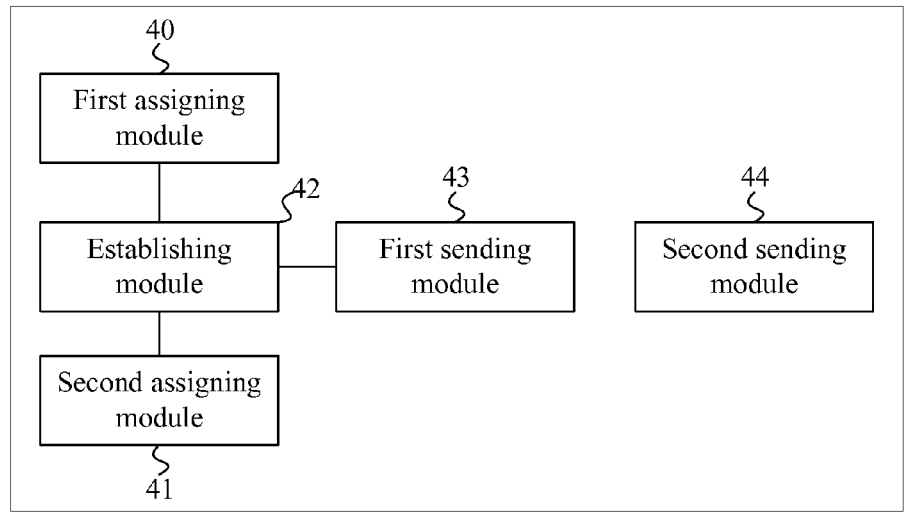
FIG. 9 is a schematic structural diagram of still another radio network control device according to an embodiment of the present invention.

FIG. 9 is a schematic structural diagram of still another radio network control device according to an embodiment of the present invention. As shown in FIG. 9, the radio network control device according to this embodiment may specifically include: a first assigning module 40, a second assigning module 41, an establishing module 42, a first sending module 43 and a second sending module 44.

The first assigning module 40 is configured to assign the second H-RNTI to the relay node according to a network access request sent by the relay node; the second assigning module 41 is configured to assign, according to a service request sent by the user equipment accessing the relay node, the first H-RNTI to the user equipment; the establishing module 42 is configured to establish a mapping relationship between the first H-RNTI of the user equipment and the second H-RNTI of the relay node accessed by the user equipment; the first sending module 43 is configured to send the mapping relationship to an access device; and the second sending module 44 is configured to send the first H-RNTI and data to the access device so that the access device sends, according to the mapping relationship, the data to the user equipment corresponding to the first H-RNTI by using the relay node corresponding to the second H-RNTI.

For example, the radio network control device according to this embodiment may be an RNC. In this embodiment, the first assigning module 40 assigns the second H-RNTI to the newly introduced RN according to the network access request of the RN; the second assigning module 41 assigns the first H-RNTI to the UE accessing the RN according to the service request initiated by the UE; the establishing module 42 is connected to the first assigning module 40 and the second assigning module 41 respectively, and establishes a mapping relationship between the first H-RNTI of the UE that is obtained by the second assigning module 41 and the second H-RNTI of the RN that is obtained by the first assigning module 40; the first sending module 43 is connected to the establishing module 42 and sends to the Node B the mapping relationship established by the establishing module 42; and the second sending module 44 sends the first H-RNTI and the data to the Node B so that the Node B sends, according to the received mapping relationship, sent by the first sending module 43, between the first H-RNTI and the second H-RNTI, the first H-RNTI and the data to the RN corresponding to the second H-RNTI, and the RN sends the data to the UE corresponding to the first H-RNTI.

The implementation mechanism of data transmission by the radio network control device according to this embodiment and between the modules in the radio network control device is the same as that of the embodiment shown in FIG. 3, the details of which can also be seen in the relevant description of the foregoing embodiment and is not repeatedly described here.

In the radio network control device according to this embodiment, the modules are used to implement data transmission to the UE at the cell edge accurately and effectively in the HSDPA network where the RN is introduced. By using the technical solution of this embodiment, the coverage capability of a cell edge is enhanced, and the efficiency in transmitting data to the UE at the cell edge is further improved.

Figure 10:
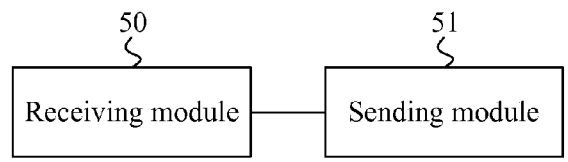
FIG. 10 is a schematic structural diagram of an access device according to an embodiment of the present invention.

FIG. 10 is a schematic structural diagram of an access device according to an embodiment of the present invention. As shown in FIG. 10, the access device according to this embodiment may specifically include: a receiving module 50 and a sending module 51.

The receiving module 50 is configured to receive the first H-RNTI of the user equipment, the second H-RNTI of the relay node accessed by the user equipment and the data that are sent by the radio network control device according to the mapping relationship between the first H-RNTI and the second H-RNTI; and the sending module 51 is configured to send, according to the second H-RNTI, the first H-RNTI and the data to the relay node corresponding to the second H-RNTI so that the relay node sends the data to the user equipment corresponding to the first H-RNTI.

For example, the access device according to this embodiment may be a Node B. In this embodiment, the receiving module 50 receives the first H-RNTI of the UE, the second H-RNTI of the RN accessed by the UE and the data that are sent by the RNC according to the mapping relationship between the first H-RNTI and the second H-RNTI; and the sending module 51 is connected to the receiving module 50, and is configured to parse the received content to obtain the second H-RNTI, and send the first H-RNTI and the data to the RN corresponding to the second H-RNTI, and the RN sends the data to the UE corresponding to the first H-RNTI.

The implementation mechanism of data transmission by the access device according to this embodiment and between the modules in the access device is the same as that of the embodiment shown in FIG. 2, the details of which can also be seen in the relevant description of the foregoing embodiment and is not repeatedly described here.

In the access device according to this embodiment, the modules are used to implement data transmission to the UE at the cell edge accurately and effectively in the HSDPA network where the RN is connected. By using the technical solution of this embodiment, the coverage capability of a cell edge is enhanced, and the efficiency in transmitting data to the UE at the cell edge is further improved.

Figure 11:
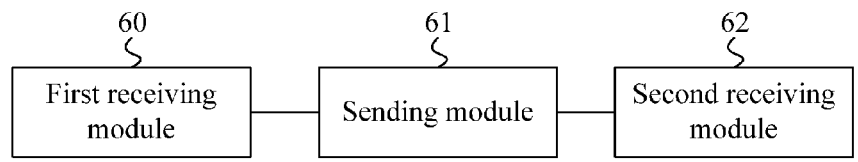
FIG. 11 is a schematic structural diagram of another access device according to an embodiment of the present invention.

FIG. 11 is a schematic structural diagram of another access device according to an embodiment of the present invention. As shown in FIG. 11, the access device according to this embodiment may specifically include: a first receiving module 60 and a sending module 61.

The first receiving module 60 is configured to receive the first H-RNTI of the user equipment and the data that are sent by the radio network control device; the sending module 61 is configured to send, according to the mapping relationship between the first H-RNTI and the second H-RNTI of the relay node accessed by the user equipment, the first H-RNTI and the data to the user equipment corresponding to the first H-RNTI by using the relay node corresponding to the second H-RNTI.

For example, the access device according to this embodiment may be a Node B. In this embodiment, the first receiving module 60 receives from the RNC the first H-RNTI of the UE and the data to be sent to the UE; and the sending module 61 is connected to the first receiving module 60, and parses, according to the prestored mapping relationship between the first H-RNTI of the UE and the second H-RNTI of the RN accessed by the UE, the content received by the first receiving module 60 to obtain the second H-RNTI corresponding to the first H-RNTI, and then sends the first H-RNTI and the data to the RN corresponding to the second H-RNTI so that the RN sends, according to the received first H-RNTI, the data to the UE corresponding to the first H-RNTI.

The implementation mechanism of data transmission by the access device according to this embodiment and between the modules in the access device is the same as that of the embodiment shown in FIG. 4, the details of which can also be seen in the relevant description of the foregoing embodiment and is not repeatedly described here.

In the access device according to this embodiment, the modules are used to implement data transmission to the UE at the cell edge accurately and effectively in the HSDPA network where the RN is connected. By using the technical solution of this embodiment, the coverage capability of a cell edge is enhanced, and the efficiency in transmitting data to the UE at the cell edge is further improved.

In another embodiment of the present invention, as shown in FIG. 11, the access device according to this embodiment may further include a second receiving module 62, where the second receiving module 62 is configured to receive the mapping relationship that is sent by the radio network control device and established between the second H-RNTI assigned to the relay node sending the network access request and the first H-RNTI assigned to the user equipment accessing the relay node.

For example, the second receiving module 62 is connected to the sending module 61. The second receiving module 62 receives the mapping relationship, sent by the RNC, between the first H-RNTI of the UE and the second H-RNTI of the RN accessed by the UE. The mapping relationship is a mapping relationship, established by the RNC, between the second H-RNTI assigned to the RN sending the network access request and the first H-RNTI of the UE accessing the RN, and is then sent by the RNC to the Node B. The sending module 61 of the Node B obtains, according to the mapping relationship received by the second receiving module 62, the second H-RNTI corresponding to the first H-RNTI received by the first receiving module 60. Then, the sending module 61 sends the first H-RNTI and the data that are received by the first receiving module 60 to the RN corresponding to the second H-RNTI, and the RN sends, according to the received first H-RNTI, the data to the UE corresponding to the first H-RNTI.

Figure 12:
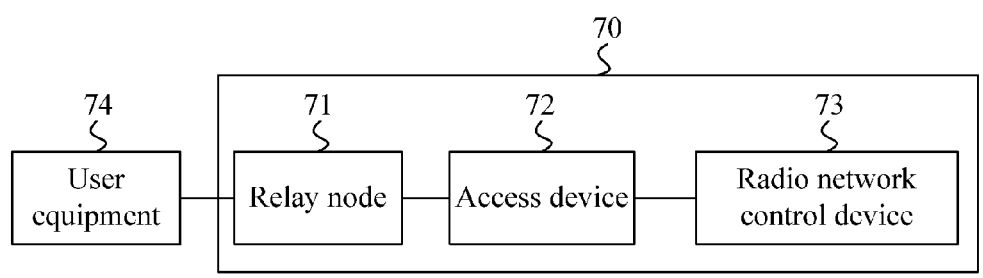
FIG. 12 is a schematic structural diagram of a system for data transmission according to an embodiment of the present invention.

FIG. 12 is a schematic structural diagram of a system for data transmission according to an embodiment of the present invention. As shown in FIG. 12, the system 70 for data transmission according to this embodiment may specifically include: a relay node 71, an access device 72 and a radio network control device 73. As shown in FIG. 12, a user equipment 74 configured to receive data is also included.

The radio network control device 73 is configured to obtain a prestored mapping relationship between a first H-RNTI of the user equipment 74 and a second H-RNTI of the relay node 71 accessed by the user equipment 74; and send, according to the mapping relationship, the first H-RNTI, the second H-RNTI and the data to the access device 72.

The access device 72 is configured to receive the first H-RNTI, the second H-RNTI and the data that are sent by the radio network control device 73; and send, according to the second H-RNTI, the first H-RNTI and the data to the relay node 71.

The relay node 71 is configured to receive the first H-RNTI and the data that are sent by the access device 72; and send the data to the user equipment 74 corresponding to the first H-RNTI.

In the system 70 for data transmission according to this embodiment, the radio network control device 73 is connected to the access device 72. The radio network control device 73 first obtains a mapping relationship, prestored by the radio network control device 73, between the first H-RNTI of the user equipment and the second H-RNTI of the relay node 71 accessed by the user equipment 74, and sends the first H-RNTI, the second H-RNTI and the data to the access device 72 according to the mapping relationship. The access device 72 is connected to the relay node 71. After receiving the first H-RNTI, the second H-RNTI and the data that are sent by the radio network control device 73, the access device 72 performs parsing to obtain the second H-RNTI, and then sends the first H-RNTI and the data to the relay node 71 corresponding to the second H-RNTI. The relay node 71 is connected to the user equipment 74, the relay node 71 sends, according to the received first H-RNTI, the data to the user equipment 74 corresponding to the first H-RNTI.

The radio network control device 73 in the system 70 for data transmission according to this embodiment may be an RNC, and specifically, the radio network control device in any embodiment shown in FIG. 7 or FIG. 8 may be used. The access device 72 in the system 70 for data transmission according to this embodiment may be a Node B, and specifically, the access device in the embodiment shown in FIG. 10 may be used. The relay node 71 in the system 70 for data transmission according to this embodiment may be the RN as described in the foregoing embodiments. The user equipment 74 configured to receive data in this embodiment may be the UE as described in the foregoing embodiments. In the system 70 for data transmission according to this embodiment, the radio network control device 73 manages and maintains the mapping relationship between the first H-RNTI of the user equipment 74 and the second H-RNTI of the relay node 71 accessed by the user equipment 74.

The implementation mechanism of data transmission by the relay node 71, the access device 72 and the radio network control device 73 in the system 70 for data transmission according to this embodiment is the same as the implementation mechanism in the embodiment shown in FIG. 7, FIG. 8 or FIG. 10, the details of which can be seen in the relevant description of the foregoing relevant embodiments and is not repeatedly described here.

In the system for data transmission according to this embodiment, the relay node is introduced in the HSDPA network so that the coverage capability of the cell edge is enhanced, and the radio network control device can transmit, according to the prestored mapping relationship between the first H-RNTI of the user equipment and the second H-RNTI of the relay node accessed by the user equipment, the data to be sent to the user equipment to the user equipment within the coverage of the relay node accurately by using the access device and the relay node. By using the technical solution of this embodiment, the efficiency in transmitting data to the user equipment at the cell edge is further effectively improved.

Figure 13:
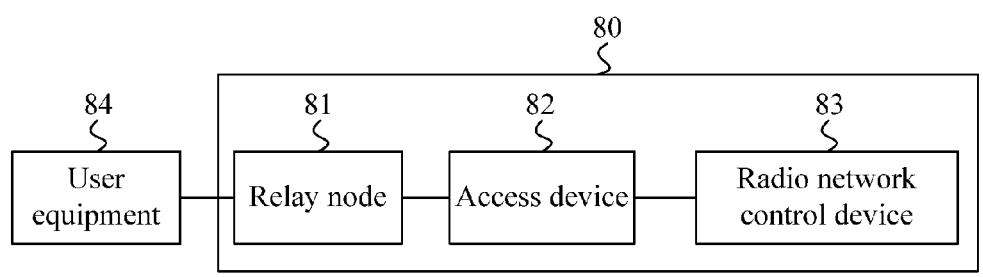
FIG. 13 is a schematic structural diagram of another system for data transmission according to an embodiment of the present invention.

FIG. 13 is a schematic structural diagram of another system for data transmission according to an embodiment of the present invention. As shown in FIG. 13, the system 80 for data transmission according to this embodiment may specifically include: a relay node 81, an access device 82 and a radio network control device 83. As shown in FIG. 13, a user equipment 84 configured to receive data is also included.

The radio network control device 83 is configured to assign the second H-RNTI to the relay node 81 according to a network access request sent by the relay node 81; assign, according to a service request sent by the user equipment 84 accessing the relay node 81, the first H-RNTI to the user equipment 84; establish a mapping relationship between the first H-RNTI of the user equipment 84 and the second H-RNTI of the relay node 81 accessed by the user equipment 84; send the mapping relationship to the access device 82; and send the first H-RNTI and data to the access device 82.

The access device 82 is configured to receive the first H-RNTI of the user equipment 84 and the data that are sent by the radio network control device 83; and send the first H-RNTI and the data to the relay node 81 corresponding to the second H-RNTI according to the received mapping relationship sent by the radio network control device 83; and the relay node 81 is configured to receive the first H-RNTI and the data that are sent by the access device 82, and send the data to the user equipment 84 corresponding to the first H-RNTI.

In the system 80 for data transmission according to this embodiment, the radio network control device 83 is connected to the access device 82, the access device 82 is connected to the relay node 81, and the relay node 81 is further connected to the user equipment 84 falling within the service scope of the relay node 81. First, the radio network control device 83 assigns the second H-RNTI to the relay node 81 according to the network access request sent by the relay node 81 by using the access device 82, and notifies the second H-RNTI to the access device 82 through the Iub interface so that the access device 82 notifies the second H-RNTI to the relay node 81. Then, the radio network control device 83 assigns the first H-RNTI to the user equipment 84 accessing the relay node 81 according to the service request sent by the user equipment 84, and similarly, notifies the first H-RNTI to the user equipment 84 by using the access device 82 and the relay node 81 accessed by the user equipment 84. The radio network control device 83 establishes the mapping relationship between the first H-RNTI of the user equipment 84 and the second H-RNTI of the relay node 81 accessed by the user equipment 84. Afterwards, the radio network control device 83 sends the established mapping relationship to the access device 82, and then sends to the access device 82 the first H-RNTI of the user equipment 84 and the data to be sent to the user equipment 84. After receiving the first H-RNTI and the data, the access device 82 parses the received content to obtain the first H-RNTI, and then obtains the second H-RNTI corresponding to the first H-RNTI according to the received mapping relationship sent by the radio network control device 83, and sends the first H-RNTI and the data to the relay node 81 corresponding to the second H-RNTI so that the relay node 81 sends, according to the received first H-RNTI, the data to the user equipment 84 corresponding to the first H-RNTI.

The radio network control device 83 in the system 80 for data transmission according to this embodiment may be an RNC, and specifically, the radio network control device in the embodiment shown in FIG. 9 may be used. The access device 82 in the system 80 for data transmission according to this embodiment may be a Node B, and specifically, the access device in the embodiment shown in FIG. 11 may be used. The relay node 81 in the system 80 for data transmission according to this embodiment may be the RN as described in the foregoing embodiments. The user equipment 84 of this embodiment may be the UE as described in the foregoing embodiments.

The implementation mechanism of data transmission by the relay node 81, the access device 82 and the radio network control device 83 in the system 80 for data transmission according to this embodiment is the same as the implementation mechanism in the embodiment shown in FIG. 9 or FIG. 11, the details of which can be seen in the relevant description of the foregoing relevant embodiments and is not repeatedly described here. In the system 80 for data transmission according to this embodiment, the access device 82 manages and maintains the mapping relationship between the first H-RNTI of the user equipment 84 and the second H-RNTI of the relay node 81 accessed by the user equipment 84.

In the system for data transmission according to this embodiment, the relay node is introduced in the HSDPA network so that the coverage capability of the cell edge is enhanced, and by using the mapping relationship, prestored by the access device, between the first H-RNTI of the user equipment and the second H-RNTI of the relay node accessed by the user equipment, the received data that is sent by the radio network control device to the user equipment can be transmitted to the user equipment within the coverage of the relay node accurately by using the relay node. By using the technical solution of this embodiment, the efficiency in transmitting data to the user equipment at the cell edge is further effectively improved.

Persons skilled in the art may clearly understand that for convenience and simplicity of description, the specific operation procedures of the foregoing system, apparatus and units can be seen in the corresponding procedures in the foregoing method embodiments and are not repeatedly described here.

It should be understood that in the several embodiments provided by the present application, the disclosed system, apparatus and method may be implemented by other means without departing from the spirit and scope of the present application. For example, the forgoing apparatus embodiments are only exemplary. For example, the division of the units is only a logic function division, and there may be other means of division in actual implementation, for example, multiple units or components may be combined or integrated into another system, or some features may be ignored, or not executed. The units described as separate components may or may not be physically separated, and the components shown as units may or may not be physical units, that is, may be located in one place or may be distributed to at least two network units. Part or all of the modules may be selected according to the actual needs to implement the objective of the solutions of the embodiments. Persons of ordinary skill in the art may understand and implement the embodiments without creative efforts.

Through the description of the foregoing embodiments, persons skilled in the art may clearly understand that the present invention may be implemented by means of software and a necessary general hardware platform, or of course, by means of hardware, but the former is preferred in many cases. Based on such understanding, the technical solutions of the present invention or the portions contributing to the prior art or part or all of the technical solutions may be embodied in the form of a software product. The computer software product is stored in a storage medium and includes several instructions to cause a computer device (which may be a personal computer, a server, a network device, and so on) to execute all or part of the steps of the method described in the embodiments of the present invention. The storage medium may be any medium capable of storing program codes, such as a USB flash drive, a removable hard disk, a read only memory (ROM), a random access memory (RAM), a magnetic disk or an optical disk.

Finally, it should be noted that the foregoing embodiments are used only to describe the technical solutions of the present invention instead of limiting the present invention. Although the present invention is described in detail with reference to the foregoing embodiments, persons of ordinary skill in the art should understand that modifications can be made to the technical solutions described in the foregoing embodiments or equivalent replacements can be made to some technical features in the technical solutions, as long as such modifications or replacements do not cause the essence of corresponding technical solutions to depart from the spirit and scope of the present invention.

What is claimed is:

1. A method for data transmission, the method comprising:
sending, according to a mapping relationship between a first high-speed downlink shared channel (HS-DSCH) radio network temporary identity (H-RNTI) of a user equipment and a second H-RNTI of a relay node accessed by the user equipment, data to the user equipment corresponding to the first H-RNTI by using the relay node corresponding to the second H-RNTI;
wherein the sending, comprises: obtaining, by a radio network control device, a prestored mapping relationship between the first H-RNTI of the user equipment and the second H-RNTI of the relay node accessed by the user equipment; and
sending, by the radio network control device according to the mapping relationship, the first H-RNTI, the second H-RNTI and the data to an access device so that the access device sends the data to the user equipment corresponding to the first H-RNTI by using the relay node corresponding to the second H-RNTI.

2. The method for data transmission according to claim 1, further comprising: assigning, by the radio network control device, the second H-RNTI to the relay node according to a network access request sent by the relay node; assigning, by the radio network control device according to a service request sent by the user equipment accessing the relay node, the first H-RNTI to the user equipment; and establishing and storing, by the radio network control device, the mapping relationship between the first H-RNTI of the user equipment and the second H-RNTI of the relay node accessed by the user equipment.

3. The method for data transmission according to claim 1, wherein the sending comprises sending, by the radio network control device, the first H-RNTI and the data to an access device so that the access device sends, according to a prestored mapping relationship between the first H-RNTI of the user equipment and the second H-RNTI of the relay node accessed by the user equipment, the data to the user equipment corresponding to the first H-RNTI by using the relay node corresponding to the second H-RNTI.

4. The method for data transmission according to claim 3, further comprising:

assigning, by the radio network control device, the second H-RNTI to the relay node according to a network access request sent by the relay node;

assigning, by the radio network control device according to a service request sent by the user equipment accessing the relay node, the first H-RNTI to the user equipment;

establishing, by the radio network control device, the mapping relationship between the first H-RNTI of the user equipment and the second H-RNTI of the relay node accessed by the user equipment; and sending, by the radio network control device, the mapping relationship to the access device for storage by the access device.

5. The method for data transmission according to claim 1, wherein the sending comprises:

receiving, by an access device, the first H-RNTI of the user equipment, the second H-RNTI of the relay node accessed by the user equipment and the data that are sent by the radio network control device according to the mapping relationship between the first H-RNTI and the second H-RNTI; and sending, by the access device according to the second H-RNTI, the first H-RNTI and the data to the relay node corresponding to the second H-RNTI so that the relay node sends the data to the user equipment corresponding to the first H-RNTI.

6. The method for data transmission according to claim 1, wherein the sending comprises receiving, by an access device, the first H-RNTI and the data that are sent by a radio network control device, and sending, by the access device according to a prestored mapping relationship between the first H-RNTI and the second H-RNTI of the relay node accessed by the user equipment, the first H-RNTI and the data to the relay node corresponding to the second H-RNTI so that the relay node sends the data to the user equipment corresponding to the first H-RNTI.

7. The method for data transmission according to claim 6, further comprising:

receiving and storing, by the access device, the mapping relationship that is sent by the radio network control device and established between the second H-RNTI assigned to the relay node sending a network access request and the first H-RNTI assigned to the user equipment accessing the relay node.

8. A radio network control device, comprising:

a processor, configured to obtain a prestored mapping relationship between a first high-speed downlink shared channel (HS-DSCH) radio network temporary identity (H-RNTI) of a user equipment and a second H-RNTI of a relay node accessed by the user equipment; and a transmitter, configured to send, according to the mapping relationship, the first H-RNTI, the second H-RNTI and data to an access device so that the access device sends the data to the user equipment corresponding to the first H-RNTI by using the relay node corresponding to the second H-RNTI.

9. The radio network control device according to claim 8, wherein the processor is further configured to assign the second H-RNTI to the relay node according to a network access request sent by the relay node, to assign, according to a service request sent by the user equipment accessing the relay node, the first H-RNTI to the user equipment, and to establish and store the mapping relationship between the first H-RNTI of the user equipment and the second H-RNTI of the relay node accessed by the user equipment.

10. An access device, comprising:

a receiver, configured to receive a first high-speed downlink shared channel (HS-DSCH) radio network temporary identity (H-RNTI) of a user equipment, a second H-RNTI of a relay node accessed by the user equipment and data that are sent by a radio network control device according to a mapping relationship between the first H-RNTI and the second H-RNTI; and a transmitter, configured to send, according to the second H-RNTI, the first H-RNTI and the data to the relay node corresponding to the second H-RNTI so that the relay node sends the data to the user equipment corresponding to the first H-RNTI.

11. A radio network control device, comprising:

a processor, configured to assign a second high-speed downlink shared channel (HS-DSCH) radio network temporary identity (H-RNTI) to a relay node according to a network access request sent by the relay node, to assign a first H-RNTI to the user equipment according to a service request sent by a user equipment accessing the relay node and to establish establish a mapping relationship between the first H-RNTI of the user equipment and the second H-RNTI of the relay node accessed by the user equipment; and a transmitter, configured to send the mapping relationship to an access device and to send the first H-RNTI and data to the access device so that the access device sends, according to the mapping relationship, the data to the user equipment corresponding to the first H-RNTI by using the relay node corresponding to the second H-RNTI.

12. An access device, comprising:

a receiver, configured to receive a first high-speed downlink shared channel (HS-DSCH) radio network temporary identity (H-RNTI) of a user equipment and data that are sent by a radio network control device; and a transmitter, configured to send, according to a mapping relationship between the first H-RNTI and a second H-RNTI of a relay node accessed by the user equipment, the first H-RNTI and the data to the user equipment corresponding to the first H-RNTI by using the relay node corresponding to the second H-RNTI.

13. The access device according to claim 12, further comprising:

a receiver, configured to receive and store the mapping relationship that is sent by the radio network control device and established between the second H-RNTI assigned to the relay node sending a network access request and the first H-RNTI assigned to the user equipment accessing the relay node.

14. A system for data transmission, comprising:

a relay node;

an access device; and a radio network control device;

wherein the radio network control device is configured to obtain a prestored mapping relationship between a first high-speed downlink shared channel (HS-DSCH) radio network temporary identity (H-RNTI) of a user equipment and a second H-RNTI of a relay node accessed by the user equipment, and to send, the first H-RNTI, the second H-RNTI and data to the access device according to the mapping relationship;

wherein the access device is configured to receive the first H-RNTI, the second H-RNTI and the data that are sent by the radio network control device, and to send, according to the second H-RNTI, the first H-RNTI and the data to the relay node, and wherein the relay node is configured to receive the first H-RNTI and the data that are sent by the access device; and send the data to the user equipment corresponding to the first H-RNTI.

15. A system for data transmission, comprising:

a relay node;

an access device; and a radio network control device;

wherein the radio network control device is configured to assign a second H-RNTI to the relay node according to a network access request sent by the relay node, to assign, according to a service request sent by a user equipment accessing the relay node, a first H-RNTI to the user equipment; to establish a mapping relationship between the first H-RNTI of the user equipment and the second H-RNTI of the relay node accessed by the user equipment; to send the mapping relationship to the access device; and to send the first H-RNTI and data to the access device;

wherein the access device is configured to receive the first H-RNTI of the user equipment and the data that are sent by the radio network control device, and to send, according to the received mapping relationship sent by the radio network control device, the first H-RNTI and the data to the relay node corresponding to the second H-RNTI; and wherein the relay node is configured to receive the first H-RNTI and the data that are sent by the access device, and to send the data to the user equipment corresponding to the first H-NTI.

* * * * *

UNITED STATES PATENT AND TRADEMARK OFFICE
CERTIFICATE OF CORRECTION

PATENT NO. : 8,665,776 B2  
APPLICATION NO. : 13/572572  
DATED : March 4, 2014  
INVENTOR(S) : Zhen Zhou et al.

Page 1 of 1

It is certified that error appears in the above-identified patent and that said Letters Patent is hereby corrected as shown below:

In the Claims:

In Col. 22, line 36, claim 11, delete "establish establish" and insert --establish--.
In Col. 24, line 22, claim 15, delete "H-NTI" and insert --H-RNTI--.

Signed and Sealed this
Sixth Day of May, 2014

Michelle K. Lee
*Deputy Director of the United States Patent and Trademark Office*